Feb. 1, 1949.  C. M. O'LEARY  2,460,428
MECHANICAL MOVEMENT FOR SLUSH PUMPS
Filed Oct. 15, 1945  2 Sheets-Sheet 1
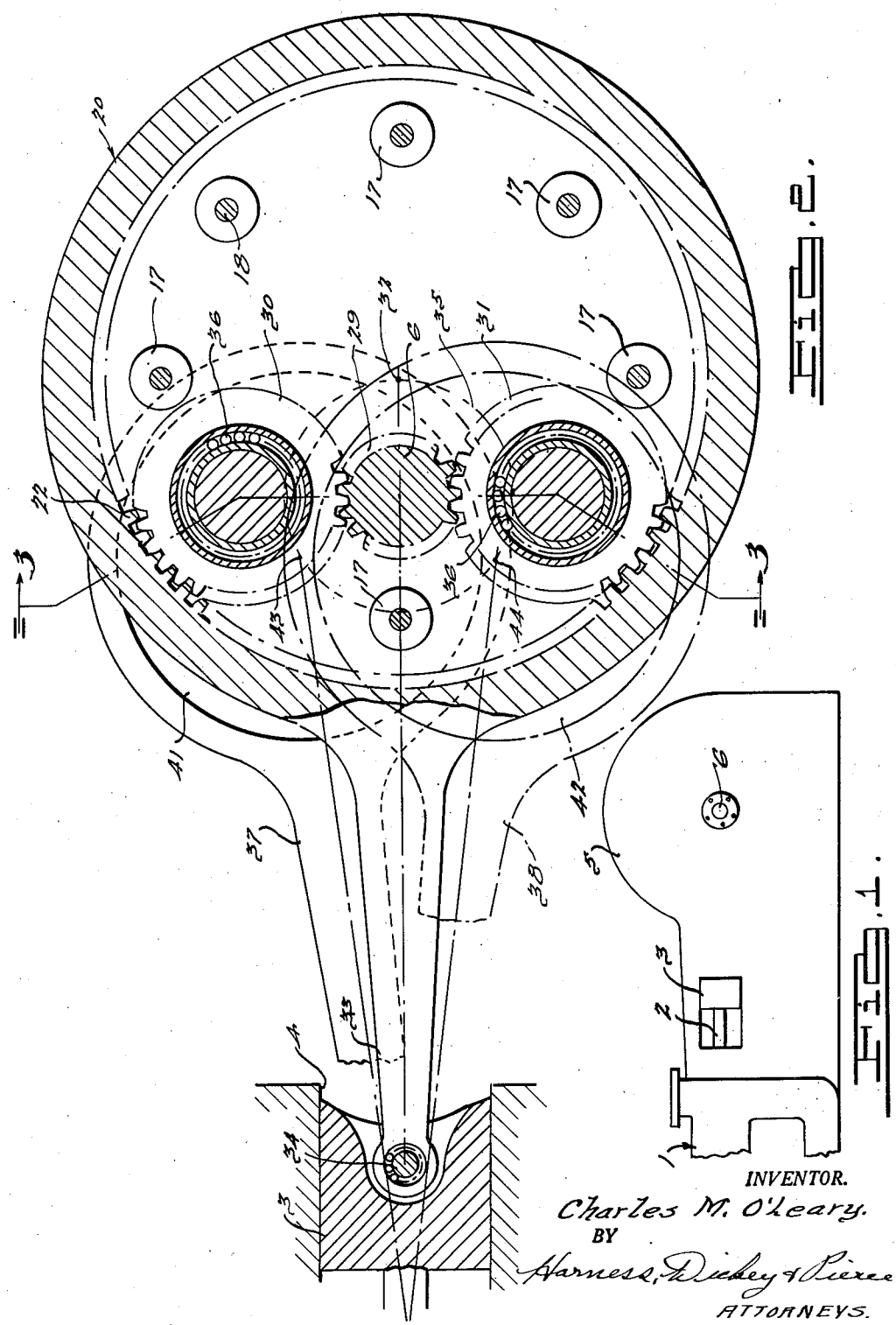
INVENTOR.
Charles M. O'Leary.
BY
Harness, Dickey & Pierce
ATTORNEYS.

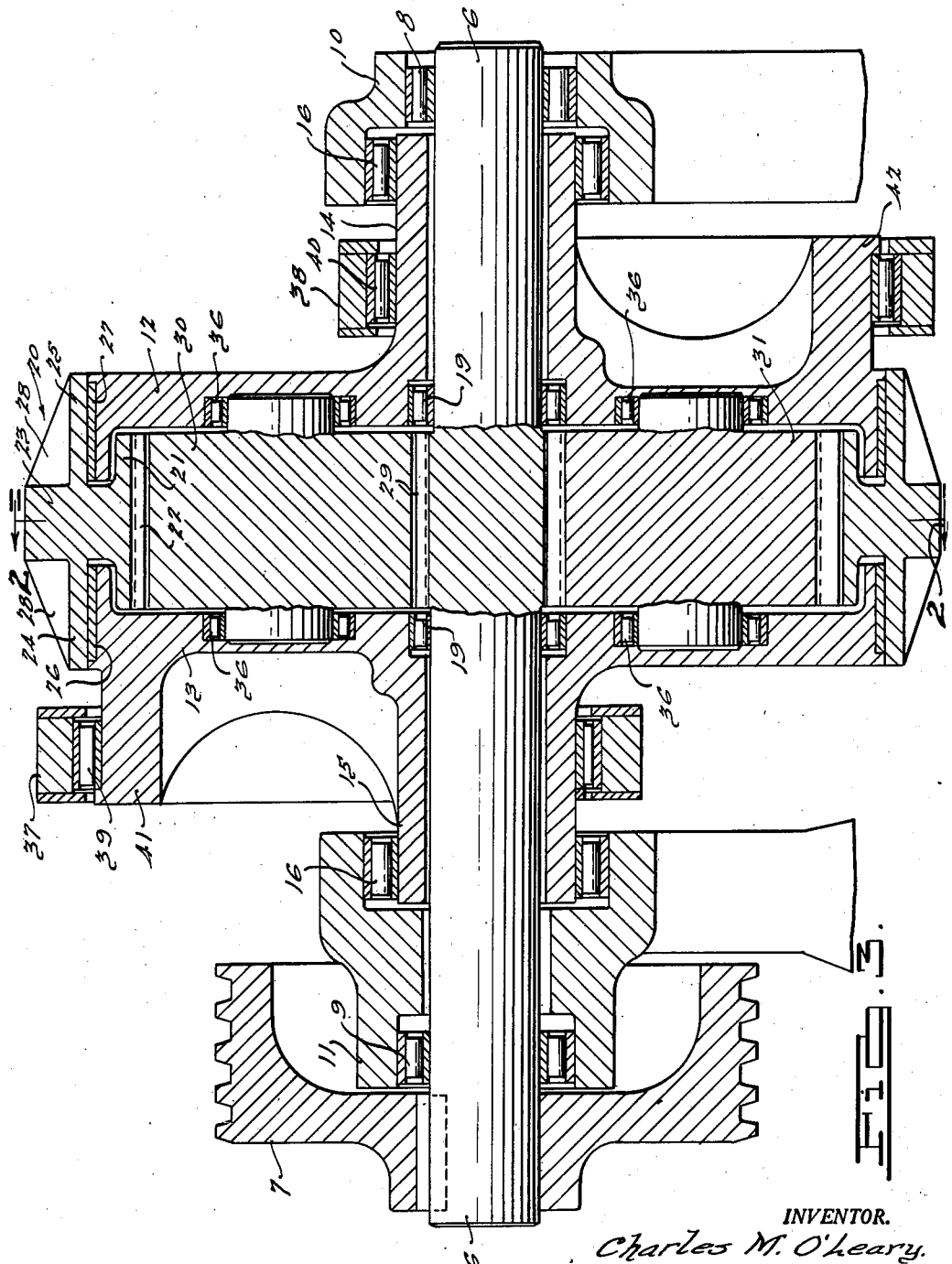

Patented Feb. 1, 1949

2,460,428

UNITED STATES PATENT OFFICE 2,460,428

MECHANICAL MOVEMENT FOR SLUSH PUMPS

Charles M. O'Leary, Los Angeles, Calif.

Application October 15, 1945, Serial No. 622,327

9 Claims. (Cl. 74—52)

The present invention relates to a drive mechanism for converting rotary to reciprocating motion or vice versa, and particularly to a heavy duty reciprocating pump mechanism incorporating such a drive mechanism.

Serious difficulties are encountered in the design of crank type reciprocating pumps required to pump large volumes of liquid against very high pressures, such as the so called slush pumps employed to circulate the drilling "mud" or fluid in the rotary drilling of deep wells. Direct acting steam driven slush pumps present no particular problems, but in many cases steam is not available and consequently, many slush pumps are operated from an internal combustion engine. These are universally crank-type pumps. While the present invention has other applications, it is particularly suited to the requirements of a large heavy duty slush pump driven from a rotating source of power, such as an engine.

Due to the very heavy pressures required, crank type slush pumps are conventionally driven through speed reducing gears, including a small drive pinion on a counter-shaft and a large gear on the crank shaft. The small pinion, in turn, is usually driven from a small pulley on the engine to a large pulley on the countershaft. The very heavy loads to which these gears are subject requires the use of gears of great width, which are difficult to manufacture with such accuracy as is required to distribute the load over the full face of the gears. In addition, the force tending to separate the gears under conditions of extreme loading, heavily loads the bearings and sometimes even forces the gears apart and destroys the gears or bearings.

In addition, the necessity of minimizing pressure and load fluctuations requires the use of multi-cylinder pumps, the pistons of which are connected in out-of-phase relation to a common crank. This lengthens the crank shaft, increases the bending loads on the crank shaft and subjects the crank shaft bearings to severe stresses.

It is the general object of the present invention to provide a drive mechanism to convert rotary to reciprocating motion or vice versa, which, when used in reciprocating pump drive in lieu of a conventional crank mechanism, will overcome the above mentioned defects and greatly reduce the loads on the gear teeth and bearings of the mechanism.

Another object of the present invention is to provide a mechanism of the above type incorporating gearing of such character that the gear tooth pressure imposes no load upon the bearings of the drive shaft.

Another object of the invention is to provide a drive mechanism of the type mentioned in which gear tooth loadings for a given speed reduction and load are approximately half of those encountered in a conventional crank driven mechanism.

Another object of the invention is to provide a mechanism of the type mentioned which may be utilized to operate any desired number of pistons but is peculiarly suited in the operation of either a single cylinder or multiples of three cylinders, and in which the drive mechanism is peculiarly free of injurious cantilever or bending strains.

Other objects and advantages of the invention will become apparent from the following specification, the accompanying drawings and appended claims.

In the drawings:

Figure 1 is a fragmentary side elevation of a three cylinder slush pump incorporating the preferred form of the present invention;

Figure 2 is a longitudinal section through the drive mechanism of the present invention as employed in the slush pump of Figure 1 taken on the line 2—2 of Figure 3 and;

Figure 3 is a transverse section taken on the line 3—3 of Figure 2.

As shown in the drawings and particularly in Figure 1, the pump may comprise a bank of cylinders indicated generally at 1 which may be of any desired or conventional construction and incorporate the usual valves and associated inlet and discharge conduits. Each cylinder contains a piston which is driven by a piston rod, one of which is indicated at 2 in Figure 1, the free end of the rod being fixed in any desired manner to a cross head 3 slidable in suitable guide ways indicated diagrammatically in Figure 2 by the numeral 4. It will be understood that there is a piston rod and associated cross head and guide way therefor, for each of the cylinders. The drive mechanism itself may be enclosed in any suitable housing 5 and includes a drive shaft 6 which projects from the housing and is adapted to receive a drive pulley 7, as best shown in Figure 3. The pulley 7 may be connected by a belt to any suitable source of rotating power such as one or more internal combustion engines.

Shaft 6 is journaled by means of bearings 8 and 9, carried by bearing pedestals 10 and 11 respectively, which are fixed in any suitable manner, not shown, on the bed of the machine. Likewise journaled concentrically with the axis of the shaft 6 on the bearing pedestals 10 and 11 are a pair of relatively heavy side plates 12 and 13. Each of the side plates is provided with an axial projecting boss 14 and 15 respectively, which are journaled by means of bearings 16 in the bearing pedestals. The side plates 12 and 13 are each provided with a plurality of inwardly projecting bosses 17, six in number, the bosses on one of the members projecting into endwise contact with those on the other member; and the two members are fixedly secured together by a plurality of bolts 18 passing through the aligned bosses. As a result of this arrangement, the two side plates 12 and 13 are rigidly locked together to provide an exceedingly stiff supporting structure. The driving shaft 6 is supported intermediate its ends upon a pair of bearings 19 fitted within suitable counterbores formed in the side plates 12 and 13 respectively.

The outer peripheries of the plates 12 and 13 are cylindrical and the cylinder common to their peripheries is eccentric with respect to shaft 6. The cylindrical peripheries serve as a journal for an internal gear element indicated generally at 20. The internal gear element 20 comprises an inner ring 21 provided with internal gear teeth 22 and a radially extending relatively heavy rib 23, which project outwardly between the inner edges of the plates 12 and 13, as best shown in Figure 3. Member 20 also includes a pair of axially extending cylindrical flanges 24 and 25 which are journaled by means of anti-friction bearings 26 and 27 on the cylindrical peripheries of the plates 12 and 13. A plurality of axially extending stiffening ribs 28 are provided for supporting the flanges 24 and 25. The gear member 20 constitutes the internal gear of an epicyclic gear train of the sun and planet type, the sun gear of the gear train being the relatively small pinion 29, which is fixed to the driving shaft 6 intermediate the plates 12 and 13. The rigidly connected plates 12 and 13 constitute the supporting cage for a pair of planet gears 30 and 31, each of which meshes with the sun gear 29 and also the internal gear teeth 22 of the gear 20. Each planet gear is provided with oppositely projecting stub shafts which are journaled in bearings 36 carried by the plates 12 and 13.

The sun and planet gear mechanism, thus provided, differs from conventional sun and planet gear trains in that the axis of the internal gear is eccentric with respect to the axis of the sun gear. Thus, the internal gear 20 and the peripheries of plates 12 and 13 have a common center indicated by a numeral 32 in Figure 2, while the bosses 14 and 15 on the side plates are concentric with shaft 6.

The internal gear member 20 is integrally fixed to one end of a connecting rod 33, while the opposite end of the rod is journaled with respect to the cross head 3 on a pin 34. As a result of this connection between the internal gear 20 and the cross head 3, it will be apparent that the internal gear is restrained against rotation except for the limited oscillatory rotation incident to the varying angularity of the connecting rod. Accordingly, when the drive shaft 6 is rotated, the sun gear 29 rotates the planet gears 30 and 31 and causes them to travel around the interior of the internal gear 20 in the direction of rotation of the sun gear 29. Since the internal gear is restrained by the connecting rod against any substantial rotation, this movement of the planet gears will cause the planet cage 12—13 to rotate in the same direction about the axis of the driving shaft 6. Consequently, the planet cage is a large eccentric which has its center at a point 32 and which rotates about the axis of shaft 6, thereby transmitting a crank type action to the right hand end of the connecting rod 33. During such operation, the center 32 of the eccentric and the internal gear 20 will rotate at a substantially uniform rate in the circle indicated in dotted lines at 35. The slight deviation from uniform rotary motion due to the change in angularity of the connecting rod 33, is not objectionable and may be reduced to any desired extent by increasing the length of the connecting rod.

It will be noted that the planet gears 30 and 31 are located on diametrically opposite sides of the sun gear 29. Consequently, the loads transmitted by the sun gear to the planet gears are equal and opposite, with the result that no loads are imposed upon the bearings for shaft 6 as a result of the gear tooth loadings. In addition, since the driving torque required to rotate the planet cage is divided equally between the planet gears 30 and 31, the gear tooth loadings are only half of those required to rotate a conventional crank. This permits the use of narrower gears which are lighter in weight and more easily constructed to the necessary degree of accuracy.

Since the planet cage 12—13 rotates at a substantially uniform speed about the axis of shaft 6, it may be provided with any desired number of additional eccentric journals for operating other cylinders, if desired. Thus, in the preferred embodiment of the invention shown, the mechanism is employed in connection with a three cylinder pump, the piston in one cylinder of which is connected by rod 33 to the internal gear member 20. The connecting rods 37 and 38 of the other two pistons are journaled at their outer ends upon roller bearings 39 and 40 carried respectively by eccentric axially extending cylindrical flanges 41 and 42, which project in the opposite direction from the side plates 13 and 12, respectively. The center 43 of the journal flange 41 and the center 44 of the journal flange 42 are preferably located on crank circle 35 at equal distances from each other and the center 32 of the internal gear 20. Accordingly, the three pistons of the pump mechanism are operated in an out-of-phase relation to each other in order to minimize fluctuations in pressure and driving loads.

A very substantial speed reduction may be provided between the drive pinion or sun gear 29 and the planet cage 12—13, because the speed ratio is equal to the ratio of diameters of the sun gear 29 to the internal gear 20 plus 1. For example, if the pitch diameter of gear 29 is 1 and that of gear 20 is 6, then gear 29 will rotate seven revolutions for each revolution of the planet cage. The gear ratios and the length of stroke may be varied as desired by changing the relative diameters of gears 20 and 29 and by changing the diameter of crank circle 35. In general, increases in the length of stroke require increases in the ratio of diameters of gears 20 and 29. Thus, the torque applied to the pulley 7 on the driving shaft 6 may be correspondingly reduced. The planet cage structure, due to its substantial radial extent and heavy construction, is not subject to objectionable bending loads by the thrust exerted by connecting rods. Moreover, since the drive gearing is located internally with respect to the journal for the center connecting rod, the unit may be close coupled to reduce bending stresses and it is entirely free from cantilever loadings on the driving shaft or planet cage.

While only one form of the invention is illustrated and described herein, it will be apparent that variations in the design and construction may be indulged in without departing from the spirit of the invention or the scope of the appended claims. The essential feature of the invention resides in the use of eccentric epicycloid gearing in which one of the gears is fixed to a connecting rod and is eccentric with respect to the common axis of rotation of the planet gear cage and the drive gear. While it is preferred to employ a double planetary gear connection between the sun gear and the internal gear in the form of the invention illustrated and described, in order to reduce tooth loading or width, it is apparent that a single planet gear may be employed, if desired, without loss of the advantages of the invention. In addition a compound epicycloid gearing may be substituted for the simple sun and planet gear train illustrated, if desired, in order to increase the speed reduction and torque multiplication for a given size of unit.

What is claimed is:

1. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, planet gearing journaled on the member and operatively connecting the internal and sun gear, and a journal carried by said member eccentrically of the sun gear axis for the crank end of another connecting rod.

2. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, planet gearing journaled on the member and operatively connecting the internal and sun gears, and a pair of journals projecting in opposite directions from the member eccentrically of the sun gear axis, the crank ends of two other connecting rods being journaled on said journals respectively.

3. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, planet gearing journaled on the member and operatively connecting the internal and sun gears, and a connecting rod journal carried by said member eccentrically of the sun gear axis for the crank end of another connecting rod, the centers of said internal gear and said connecting rod journal being spaced circumferentially about a single circle concentric with the sun gear axis.

4. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, a pair of planet gears journaled on said member, each of said planet gears meshing with said internal gear and said sun gear, and a journal carried by said member eccentrically of the sun gear axis for the crank end of another connecting rod.

5. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, a pair of planet gears journaled on said member, each of said planet gears meshing with said internal gear and said sun gear, and a pair of journals projecting in opposite directions from the member eccentrically of the sun gear axis, the crank ends of two other connecting rods being journaled on said journals respectively.

6. An epicyclic geared crank mechanism for a multi-piston pump, including a connecting rod for each piston, a sun and planet gear train in which the internal gear is fixed to the crank end of one connecting rod and is eccentric with respect to the sun gear and the axis of the sun gear is fixed, said gear train including a member journaled on the sun gear axis, a pair of planet gears journaled on said member, each of said planet gears meshing with said internal gear and said sun gear, and a connecting rod journal carried by said member eccentrically of the sun gear axis for the crank end of another connecting rod, the centers of said internal gear and said connecting rod journal being spaced circumferentially about a single circle concentric with the sun gear axis.

7. A reciprocating slush pump connecting rod operating mechanism comprising a stationary frame, a driving gear journaled on said frame for rotation on a fixed axis, a member journaled on said axis, a gear fixed to one end of the connecting rod and journaled on the member on an axis eccentric to but parallel with the fixed axis, gearing journaled on said member and operatively connecting the first two gears, and a member mounted for reciprocation on said frame and pivotally connected to the opposite end of the connecting rod.

8. A reciprocating slush pump connecting rod operating mechanism comprising a stationary frame, a drive pinion journaled on said frame for rotation on a fixed axis, a planet gear cage rotatable about the axis of the driven pinion, a connecting rod having an internal gear fixed at one end thereof and journaled on said cage on an axis eccentric to the pinion axis, a planet gear journaled on the cage and meshing with the pinion and the internal gear, and a member mounted for reciprocation on said frame and pivotally connected to the opposite end of the connecting rod.

9. A reciprocating slush pump connecting rod operating mechanism comprising a stationary frame, a drive pinion journaled on said frame for rotation on a fixed axis, a planet gear cage rotatable about the axis of the drive pinion, a connecting rod having an internal gear fixed at one end thereof and journaled on said cage on an axis eccentric to the pinion axis, a pair of planet gears journaled on the cage on axes located on opposite sides of the pinion axis, each of said planet gears meshing with both the pinion and the internal gear, and a member mounted for reciprocation on said frame and pivotally connected to the opposite end of said connecting rod.

CHARLES M. O'LEARY.

REFERENCES CITED

The following references are of record in the file of this patent:

UNITED STATES PATENTS

| Number | Name | Date |
|---|---|---|
| 1,863,667 | Miranda | June 21, 1932 |
| 1,867,981 | Mudd | July 19, 1932 |

Certificate of Correction

Patent No. 2,460,428.                                                         February 1, 1949.

CHARLES M. O'LEARY

It is hereby certified that error appears in the printed specification of the above numbered patent requiring correction as follows:

Column 6, line 56, claim 8, for the word "driven" read *drive*; and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*